US012664322B2

(12) United States Patent
Cho et al.

(10) Patent No.: US 12,664,322 B2
(45) Date of Patent: Jun. 23, 2026

(54) SYSTEMS AND METHODS FOR ESTABLISHING AND USING DEVICE IDENTITY IN INFORMATION HANDLING SYSTEMS

(71) Applicant: Dell Products, L.P., Round Rock, TX (US)

(72) Inventors: Eugene David Cho, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 199 days.

(21) Appl. No.: 18/473,770

(22) Filed: Sep. 25, 2023

(65) Prior Publication Data

US 2025/0103755 A1     Mar. 27, 2025

(51) Int. Cl.
*G06F 21/73*          (2013.01)
*G06F 9/4401*        (2018.01)
*G06F 21/44*          (2013.01)

(52) U.S. Cl.
CPC ............ *G06F 21/73* (2013.01); *G06F 9/4411* (2013.01); *G06F 21/44* (2013.01); *G06F 2221/2141* (2013.01)

(58) Field of Classification Search
CPC ........ G06F 21/73; G06F 9/4411; G06F 21/44; G06F 2221/2141; G06F 21/575
USPC .......................................................... 726/26
See application file for complete search history.

(56) References Cited

U.S. PATENT DOCUMENTS

| | | | | | |
|---|---|---|---|---|---|
| 10,896,266 | B1 * | 1/2021 | BeSerra | ................ | H04L 63/062 |
| 11,138,132 | B2 * | 10/2021 | Lal | ........... | H04L 9/083 |
| 11,360,784 | B2 * | 6/2022 | Jacquin | ................ | G06F 9/3877 |
| 12,204,628 | B2 * | 1/2025 | Reddy | ................... | G06F 21/575 |
| 2009/0204806 | A1 * | 8/2009 | Kanemura | ............ | G06F 21/445 |
| | | | | | 713/155 |
| 2013/0031541 | A1 * | 1/2013 | Wilks | ...................... | G06F 8/654 |
| | | | | | 717/176 |
| 2014/0189890 | A1 * | 7/2014 | Koeberl | ................... | G09C 1/00 |
| | | | | | 726/34 |
| 2016/0232356 | A1 * | 8/2016 | Barkelew | .............. | G06F 9/4401 |
| 2018/0234255 | A1 * | 8/2018 | Fu | ............................ | H04L 9/30 |
| 2019/0230002 | A1 * | 7/2019 | Bernat | ................ | H04L 63/0823 |
| 2019/0311123 | A1 * | 10/2019 | Lal | ....................... | H04L 9/0891 |
| 2019/0332773 | A1 * | 10/2019 | Konetski | ............... | H04L 63/126 |
| 2020/0097658 | A1 * | 3/2020 | Samuel | ............... | G06F 11/0793 |

(Continued)

OTHER PUBLICATIONS

Cooper, D., Polk, W., Regenscheid, A. and Souppaya, M., 2011. BIOS protection guidelines. NIST Special Publication, 800(2011), p. 147. (Year: 2011).*

(Continued)

*Primary Examiner* — Philip J Chea
*Assistant Examiner* — Dorianne Alvarado David
(74) *Attorney, Agent, or Firm* — Fogarty LLP

(57) ABSTRACT

Methods and system are provided for establishing and using a uniform device identity. For instance, an information handling system (IHS) may include multiple hardware components, each of the hardware components having a respective device identity. A device identity selector may be set, either at manufacture or by a trusted downstream partner, where the device identity selector identifies one of the device identities for use by the IHS. As remote nodes or applications perform attestation operations, the IHS may use the selected device identity for attestation.

20 Claims, 8 Drawing Sheets

600

(56)          References Cited

U.S. PATENT DOCUMENTS

| | | | | |
|---|---|---|---|---|
| 2020/0134163 | A1* | 4/2020 | Courtney | G06F 21/57 |
| 2020/0220865 | A1* | 7/2020 | Finger | H04L 63/0853 |
| 2020/0382519 | A1* | 12/2020 | Barton | H04L 63/107 |
| 2021/0073003 | A1* | 3/2021 | Jacquin | G06F 21/44 |
| 2021/0136082 | A1* | 5/2021 | Andrews | H04L 63/105 |
| 2021/0243594 | A1* | 8/2021 | Suryanarayana | H04W 12/033 |
| 2021/0306157 | A1* | 9/2021 | Wattiau | H04L 9/3265 |
| 2022/0083664 | A1* | 3/2022 | Boyapalle | H04L 63/0823 |
| 2022/0108008 | A1* | 4/2022 | Bronk | G06F 21/552 |
| 2022/0207125 | A1* | 6/2022 | Young | G06F 21/44 |
| 2022/0207126 | A1* | 6/2022 | Young | H04L 9/3268 |
| 2022/0207145 | A1* | 6/2022 | Young | G06F 21/575 |
| 2022/0207185 | A1* | 6/2022 | Young | H04L 9/3247 |
| 2022/0207463 | A1* | 6/2022 | Young | G06F 21/575 |
| 2022/0229938 | A1* | 7/2022 | Robison | H04L 9/3263 |
| 2022/0276875 | A1* | 9/2022 | Jacquin | G06F 21/44 |
| 2022/0292203 | A1* | 9/2022 | Severns-Williams | G06F 21/57 |
| 2023/0342446 | A1* | 10/2023 | Reddy | G06F 21/575 |
| 2024/0364531 | A1* | 10/2024 | Satyamsetti | H04L 9/0877 |
| 2025/0103755 | A1* | 3/2025 | Cho | G06F 21/575 |

OTHER PUBLICATIONS

Maene, P., Gotzfried, J., De Clercq, R., Muller, T., Freiling, F. and Verbauwhede, I., 2017. Hardware-based trusted computing architectures for isolation and attestation. IEEE Transactions on Computers, 67(3), pp. 361-374. (Year: 2017).*

Menetrey, J., Gottel, C., Pasin, M., Felber, P. and Schiavoni, V., 2022. An exploratory study of attestation mechanisms for trusted execution environments. arXiv preprint arXiv:2204.06790. (Year: 2022).*

Stancu, F.A., Tranca, D.C. and Chiroiu, M., Sep. 2019. Tio-secure input/output for intel sgx enclaves. In 2019 International Workshop on Secure Internet of Things (SIOT) (pp. 1-9). IEEE. (Year: 2019).*

Dell Technologies, "iDRAC9 Security Configuration Guide," Jun. 2022, Rev. A01, pp. 72.

* cited by examiner

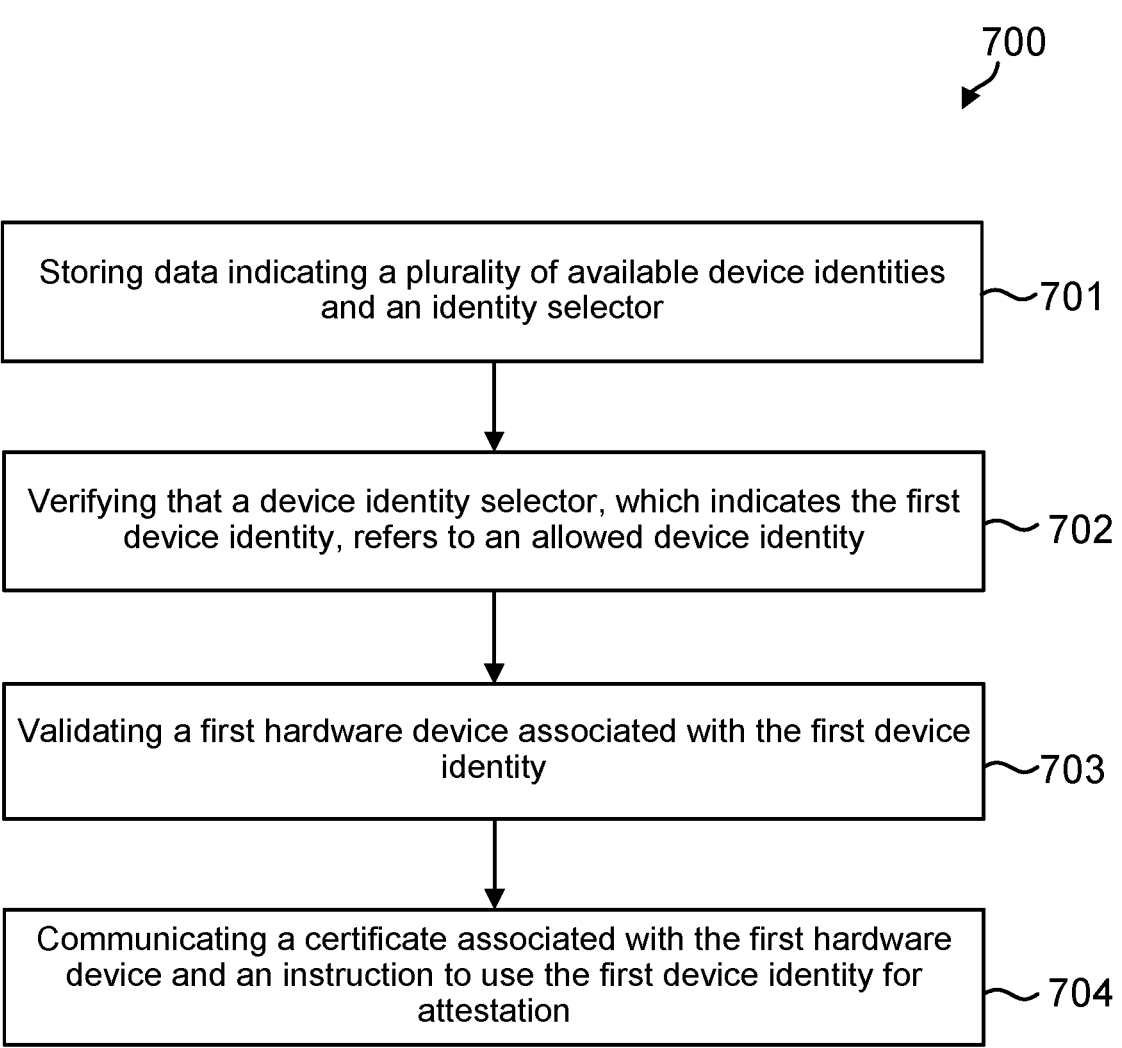

700

Storing data indicating a plurality of available device identities and an identity selector ~701

Verifying that a device identity selector, which indicates the first device identity, refers to an allowed device identity ~702

Validating a first hardware device associated with the first device identity ~703

Communicating a certificate associated with the first hardware device and an instruction to use the first device identity for attestation ~704

Receive an indication of a device identity from a BIOS during operating system boot ~801

Load a driver associated with the hardware component, and communicate with the hardware device via the driver ~802

Receive a first attestation request from a remote or local resource ~803

Facilitate attestation with respect to the device identity ~804

SYSTEMS AND METHODS FOR ESTABLISHING AND USING DEVICE IDENTITY IN INFORMATION HANDLING SYSTEMS

FIELD

The present disclosure relates generally to Information Handling Systems (IHSs) and relates more particularly to device identity in IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some systems may provide for device validation during runtime or at startup, where that device validation may depend at least in part on device identity. It would be desirable to have secure and coherent techniques for establishing and using device identity.

SUMMARY

Various embodiments provide a method for selecting a first device identity from a plurality of available device identities, the method including: at a basic input output system (BIOS), verifying that a device identity selector, which indicates the first device identity, refers to an allowed device identity; at the BIOS, validating a first hardware device associated with the first device identity; and communicating, from the BIOS to an operating system, a certificate associated with the first hardware device and an instruction to use the first device identity for attestation by software running on the host or for attestation by a remote node.

Various embodiments provide an information handling system (IHS) including: a host device comprising one or more processors and having a first device identity and a first hardware root of trust; a hardware component having a second device identity and a second hardware root of trust; and one or more memory devices coupled to the one or more processors, the memory devices storing computer-readable instructions that, upon execution by the one or more processors, cause the host device to: receive, by an operating system of the host device, an indication of the second device identity from a BIOS during operating system boot; in response to the indication of the second device identity, load a driver associated with the hardware component and communicate with the hardware component via the driver; receive a first attestation request from a remote node; and facilitate attestation with respect to the second device identity, including facilitating a proof of possession operation with respect to a private key corresponding to the second hardware root of trust, in response to the first attestation request.

Various embodiments provide a computer-readable storage device having instructions stored thereon for validating secure assembly of an IHS (Information Handling System), wherein execution of the instructions by one or more processors of the IHS causes an operating system (OS) of the IHS to: receive, from a basic input output system (BIOS), a certificate associated with a first hardware component of the IHS and an instruction to use a device identity of the first hardware component for attestation by software running on a host of the IHS or for attestation by a remote node; in response to the instruction to use the device identity of the first hardware component, load a driver associated with the hardware component and communicate with the hardware component via the driver; and facilitate attestation with respect to the device identity of the first hardware component, including facilitating a proof of possession operation with respect to a private key corresponding to a hardware root of trust of the hardware component.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 7 is a flowchart illustrating an example method to be performed by an IHS, according to some embodiments.

DETAILED DESCRIPTION

Figure 1:
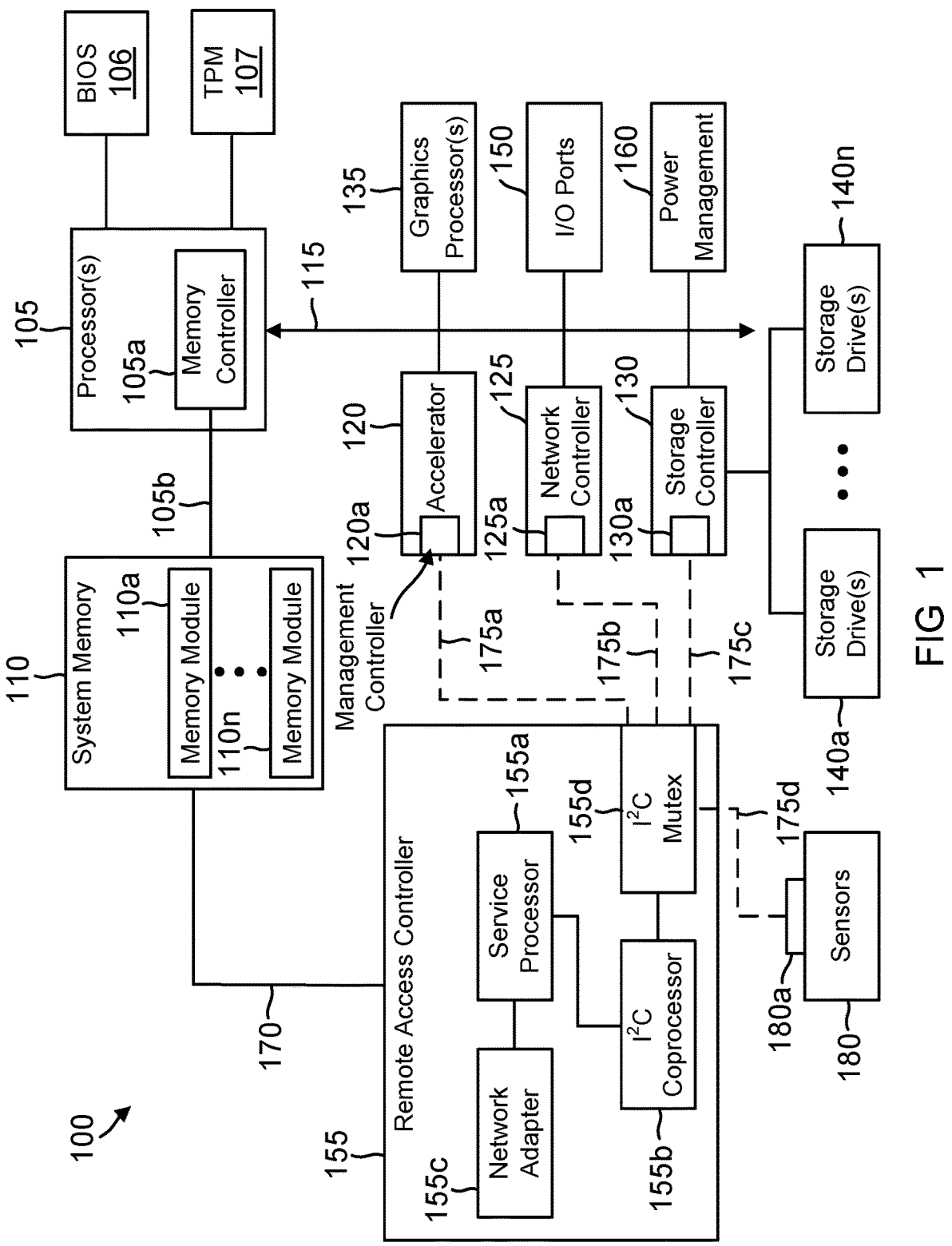
FIG. 1 is a diagram illustrating an example of an IHS configured to implement systems and methods described herein for supporting secure and coherent identification of hardware components.

Various embodiments provide systems and methods for establishing and using coherent and secure device identities. In one example, a device may have multiple components, each one of those components having its own cryptographic identity. For instance, a device (e.g., a node) may include a host, a hardware accelerator, a remote access controller, and the like. Each of the host, the hardware accelerator, and the remote access controller may include different, respective cryptographic identities.

Continuing with the example, each of the different components, such as the host, hardware accelerator, and the remote access controller, may have different network addresses, such as Internet protocol (IP) addresses. An internal or external resource, such as a remote node or an internal software process, may contact one of the IP addresses to establish trust with the device. However, depending on which IP address is used, the internal or external resource may reach any of the three different devices. Therefore, it may be difficult for an administrator or a manufacturer to keep track of which device identities may be reached during an operation to establish trust.

One implementation may address this issue by establishing a component as a central entity that manages the device identities. For instance, a basic input output system (BIOS) may be configured to manage the device identities. In one example, the BIOS may store data indicating a plurality of available device identities that are allowed to be used as a node-level identity and may also store a device identity selector that may be configured to identify one of the available device identities. The data indicating the plurality of available device identities and the device identity selector may be set, e.g., a manufacturer or downstream assembler.

At startup, the BIOS may access the device identity selector to determine which device identity to use as a node-level identity. For instance, the BIOS may select a hardware accelerator and its corresponding cryptographic identity as a node-level device identity. Accordingly, the BIOS performs attestation at startup to ensure that the component associated with the selected device identity is available for runtime use. Assuming that the component is available, then the BIOS may communicate with the operating system (OS) to notify the operating system of the selected device identity. During runtime of the OS, the OS may load appropriate kernel drivers in response to the device identity, such as a kernel driver that is employed to pass messages with the component associated with the selected device identity. Then, as both remote node attestation and local attestation requests come into the OS, the OS will pass those attestation requests to the selected component.

As noted above, the component may be a device separate from the host, such as a hardware accelerator or a remote access controller. In other examples, the component corresponding to the selected identity may be the host, in which case the operating system, which runs on the host, may not have to pass attestation requests outside of the host.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 1 shows an example of an IHS 100 configured to implement systems and methods described herein for supporting secure and coherent identification of hardware components. It should be appreciated that although the embodiments described herein may describe an IHS that is a compute sled or similar computing component that may be deployed within the bays of a chassis, other embodiments may be utilized with other types of IHSs that may also support validation of the secure assembly and delivery of the IHS 100. In the illustrative embodiment of FIG. 1, IHS 100 may be a computing component, such as a compute sled or other type of server, such as an 1RU server installed within a 2RU chassis, that is configured to share infrastructure resources provided by, e.g., a chassis or rack.

Example IHS 100 may utilize shared power, network and cooling resources provided by a chassis and/or rack. Embodiments of IHS 100 may include a wide variety of different hardware configurations. Such variations in hardware configuration may result from IHS 100 being factory assembled to include components specified by a customer that has contracted for manufacture and delivery of IHS 100. As described in additional detail below, IHS 100 may include capabilities for validating that the hardware components of IHS 100 are the same hardware components that were installed at the factory during its manufacture or were supplied for installation in the IHS 100 by a trusted entity.

IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications. In some embodiments, each of the processors 105 may be uniquely identified based on a code or other identifier that may be permanently encoded in a respective processor 105 by its manufacturer.

Embodiments support secure identification of processors 105 installed in IHS 100 in order to validate processors 105 as being the same processors that were installed at the factory during the manufacture of IHS 100. In some scenarios, the motherboard of IHS 100 on which processors 105 are mounted may be replaced. In such instances, embodiments support secure identification of the replacement motherboard in order to validate the replacement motherboard as being supplied for installation in the IHS 100 by a trusted entity.

Processor(s) 105 includes an integrated memory controller 105a that may be implemented directly within the circuitry of the processor 105, or the memory controller 105a may be a separate integrated circuit that is located on the same die as the processor 105. The memory controller 105a may be configured to manage the transfer of data to and from the system memory 110 of the IHS 105 via a high-speed memory interface 105b. The system memory 110 is coupled to processor(s) 105 via a memory bus 105b that provides the processor(s) 105 with high-speed memory used in the execution of computer program instructions by the processor(s) 105. Accordingly, system memory 110 may include memory components, such as static RAM (SRAM), dynamic RAM (DRAM), NAND Flash memory, suitable for supporting high-speed memory operations by the processor(s) 105. In certain embodiments, system memory 110 may combine both persistent, non-volatile memory and volatile memory.

In certain embodiments, the system memory 110 may include multiple removable memory modules. The system memory 110 of the illustrated embodiment includes removable memory modules 110*a-n*. Each of the removable memory modules 110*a-n* may correspond to a printed circuit board memory socket that receives a removable memory module 110*a-n*, such as a DIMM (Dual In-line Memory Module), that can be coupled to the socket and then decoupled from the socket as needed, such as to upgrade memory capabilities or to replace faulty memory modules. Other embodiments of IHS system memory 110 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 110*a-n* may be uniquely identified based on a code or other identifier that may be permanently encoded in a respective memory module 110*a-n* by its manufacturer.

IHS 100 may utilize a chipset that may be implemented by integrated circuits that are connected to each processor 105. All or portions of the chipset may be implemented directly within the integrated circuitry of an individual processor 105. The chipset may provide the processor(s) 105 with access to a variety of resources accessible via one or more in-band buses 115. Various embodiments may utilize any number of buses to provide the illustrated pathways served by in-band bus 115. In certain embodiments, in-band bus 115 may include a PCIe (PCI Express) switch fabric that is accessed via a PCIe root complex. IHS 100 may also include one or more I/O ports 150, such as PCIe ports, that may be used to couple the IHS 100 directly to other IHSs, storage resources and/or other peripheral components.

As illustrated, IHS 100 may include one or more accelerator cards 120, sometimes referred to as hardware accelerators. Each of the accelerator cards 120 supported by IHS 100 may include various processing and memory resources, in addition to, e.g., an FPGA logic unit that may include circuits that can be reconfigured after deployment of IHS 100 through programming functions supported by the accelerator card 120. Each individual accelerator card 120 may be optimized to perform specific processing tasks, such as specific signal processing, security, data mining, and artificial intelligence functions, specific networking functions, specific data storage functions, and/or to support specific hardware coupled to IHS 100. The accelerator card 120 may also include a management controller 120*a* that may support interoperation with the remote access controller 155 via a sideband device management bus 175*a*. In some embodiments, each of the accelerator cards 120 installed in IHS 100 may be uniquely identified based on a code or other identifier that may be permanently encoded in the FPGA card 120 by its manufacturer.

Processor(s) 105 may also be coupled to a network controller 125 via in-band bus 115, such as provided by a Network Interface Controller (NIC) that allows the IHS 100 to communicate via an external network, such as the Internet or a LAN. In some embodiments, network controller 125 may be a replaceable expansion card or adapter that is coupled to a motherboard connector of IHS 100. In some embodiments, network controller 125 may be an integrated component of IHS 100.

A variety of additional components may be coupled to processor(s) 105 via in-band bus 115. For instance, processor(s) 105 may also be coupled to a power management unit 260 that may interface with a power system unit of a chassis in which an IHS, such as a compute sled, may be installed. In certain embodiments, a graphics processor 135 may be included within one or more video or graphics cards, or an embedded controller, installed as components of the IHS 100. In certain embodiments, graphics processor 135 may be an integrated component of the remote access controller 155 and may be utilized to support the display of diagnostic and administrative interfaces related to IHS 100 via display devices that are coupled, either directly or remotely, to remote access controller 155.

In certain embodiments, IHS 100 may operate using BIOS 106 that may be stored in a non-volatile memory accessible by the processor(s) 105. The BIOS 106 may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100 and removable components installed within various expansion slots supported by the IHS 100. The BIOS instructions may also load an operating system for use by the IHS 100. In certain embodiments, the functions provided by BIOS 106 may be implemented, in full or in part, by the remote access controller 155. In some embodiments, BIOS 106 may be configured to identify hardware components that are detected as being currently installed in IHS 100. In such instances, BIOS 106 may support queries that access unique identifiers that have been associated with each of these detected hardware components by their respective manufacturers.

In certain embodiments, IHS 100 may utilize Unified Extensible Firmware Interface (UEFI) in addition to or instead of a BIOS. Furthermore, the examples of FIGS. 1-8 refer to BIOS for ease of illustration. It is understood, however, that any of those examples may implement UEFI and also that actions attributed to BIOS in those examples may be performed by UEFI.

In some embodiments, IHS 100 may include a TPM (Trusted Platform Module) 107 that may include various registers, such as platform configuration registers, and a secure storage, such as an NVRAM (Non-Volatile Random-Access Memory). The TPM 107 may also include a cryptographic processor that supports various cryptographic capabilities. In some examples, a pre-boot process implemented by the TPM 107 may utilize its cryptographic capabilities to calculate hash values that are based on software and/or firmware instructions utilized by certain core components of IHS, such as the BIOS 106 and boot loader of IHS 100. These calculated hash values may then be compared against reference hash values that were previously stored in a secure non-volatile memory of the IHS, such as during factory provisioning of IHS 100. In this manner, TPM 107 may establish a hardware root of trust that includes core components of IHS 100 that are validated as operating using instructions that originate from a trusted source.

IHS 100 may include a remote access controller 155 that supports remote management of IHS 100 and of various internal components of IHS 100. In certain embodiments, remote access controller 155 may operate from a different power plane from the processors 105 and other components of IHS 100, thus allowing the remote access controller 155 to operate, and management tasks to proceed, while the processing cores of IHS 100 are powered off. In some embodiments, the remote access controller 155 may perform various functions to verify the integrity of the IHS 100 and its hardware components prior to initialization of the operating system of IHS 100 (i.e., in a bare-metal state). In some embodiments, certain operations of the remote access controller 125, such as inventory certificate generation and validation operations, may operate using validated instructions, and thus within the root of trust of IHS 100.

In some embodiments, remote access controller 155 may be uniquely identified based on a code or other identifier that may be permanently encoded in a non-volatile memory of the remote access controller 155 by its manufacturer. Some embodiments may support secure identification of remote access controller 155 installed in IHS 100 in order to validate remote access controller 155 as being the same controller that was installed at the factory during the manufacture of IHS 100. Also as described below, during a provisioning phase of the factory assembly of IHS 100, a signed certificate may be stored in a non-volatile memory that is accessed by remote access controller 155, where the certificate specifies an inventory of factory installed hardware components of IHS 100 and components supplied for installation in IHS 100 by trusted entities. Using this signed inventory certificate stored by the remote access controller 155, a customer may securely identify the hardware components installed in IHS 100 in order to validate that the detected hardware components of IHS 100 are the same hardware components that were installed at the factory during manufacture of IHS 100, or as being supplied for installation in the IHS 100 by a trusted entity.

In support of the capabilities for validating the detected hardware components of IHS 100 against the inventory information that is specified in a signed inventory certificate, remote access controller 155 may support various cryptographic capabilities. For instance, remote access controller 155 may include capabilities for key generation such that remote access controller 155 may generate keypairs that include a public key and a corresponding private key. As described in additional detail below, using generated keypairs, remote access controller 155 may digitally sign inventory information collected during the factory assembly of IHS 100 such that the integrity of this signed inventory information may be validated at a later time using the public key by a customer that has purchased IHS 100. Using these cryptographic capabilities of the remote access controller 155, the factory installed inventory information that is included in an inventory certificate may be anchored to a specific remote access controller 155, since the keypair used to sign the inventory information is signed using the private key that is generated and maintained by the remote access controller 155.

In some embodiment, the cryptographic capabilities of remote access controller 155 may also include safeguards for encrypting any private keys that are generated by the remote access controller and further anchoring them to components within the root of trust of IHS 100. For instance, a remote access controller 155 may include capabilities for accessing hardware root key (HRK) capabilities of IHS 100, such as for encrypting the private key of the keypair generated by the remote access controller. In some embodiments, the HRK may include a root key that is programmed into a fuse bank, or other immutable memory such as one-time programmable registers, during factory provisioning of IHS 100. The root key may be provided by a factory certificate authority, such as described below. By encrypting a private key using the hardware root key of IHS 100, the hardware inventory information that is signed using this private key is further anchored to the root of trust of IHS 100. If a root of trust cannot be established through validation of the remote access controller cryptographic functions that are used to access the hardware root key, the private key used to sign inventory information cannot be retrieved.

In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMB, the encrypted private key can only be retrieved by a component within the root of trust of IHS 100, such as the remote access controller 155.

Remote access controller 155 may include a service processor 155a, or specialized microcontroller, that operates management software that supports out-of-band monitoring and administration of IHS 100. Remote access controller 155 may be installed on the motherboard of IHS 100 or may be coupled to IHS 100 via an expansion slot provided by the motherboard. In support of remote monitoring functions, network adapter 125c may support connections with remote access controller 155 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely. In some embodiments, remote access controller 155 may be implemented as a baseboard management controller (BMC).

In some embodiments, remote access controller 155 may support monitoring and administration of various managed devices 120, 125, 130, 180 of an IHS via a sideband bus interface. For instance, messages utilized in device management may be transmitted using I2C sideband bus connections 175a-d that may be individually established with each of the respective managed devices 120, 125, 130, 180 through the operation of an I2C multiplexer 155d of the remote access controller. As illustrated, certain of the managed devices of IHS 100, such as non-standard hardware 120, network controller 125 and storage controller 130, are coupled to the IHS processor(s) 105 via an in-line bus 115, such as a PCIe root complex, that is separate from the I2C sideband bus connections 175a-d used for device management. The management functions of the remote access controller 155 may utilize information collected by various managed sensors 180 located within the IHS. For instance, temperature data collected by sensors 180 may be utilized by the remote access controller 155 in support of closed-loop airflow cooling of the IHS 100.

In certain embodiments, the service processor 155a of remote access controller 155 may rely on an I2C co-processor 155b to implement sideband I2C communications between the remote access controller 155 and managed components 120, 125, 130, 180 of the IHS. The I2C co-processor 155b may be a specialized co-processor or microcontroller that is configured to interface via a sideband I2C bus interface with the managed hardware components 120, 125, 130, 180 of IHS. In some embodiments, the I2C co-processor 155b may be an integrated component of the service processor 155*a*, such as a peripheral system-on-chip feature that may be provided by the service processor 155*a*. Each I2C bus 175*a-d* is illustrated as single line in FIG. 2. However, each I2C bus 175*a-d* may include a clock line and data line that couple the remote access controller 155 to 12C endpoints 120*a*, 125*a*, 130*a*, 180*a* which may be referred to as modular field replaceable units (FRUs).

The I2C co-processor 155*b* may interface with the individual managed devices 120, 125, 130, 180 via individual sideband 12C buses 175*a-d* selected through the operation of an 12C multiplexer 155*d*. Via switching operations by the 12C multiplexer 155*d*, a sideband bus connection 175*a-d* may be established by a direct coupling between the I2C co-processor 155*b* and an individual managed device 120, 125, 130, 180. In providing sideband management capabilities, the 12C co-processor 155*b* may each interoperate with corresponding endpoint 12C controllers 120*a*, 125*a*, 130*a*, 180*a* that implement the I2C communications of the respective managed devices 120, 125, 130. The endpoint 12C controllers 120*a*, 125*a*, 130*a*, 180*a* may be implemented as a dedicated microcontroller for communicating sideband 12C messages with the remote access controller 155, or endpoint 12C controllers 120*a*, 125*a*, 130*a*, 180*a* may be integrated SoC functions of a processor of the respective managed device endpoints 120, 125, 130, 180.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a system-on-chip.

Figure 2:
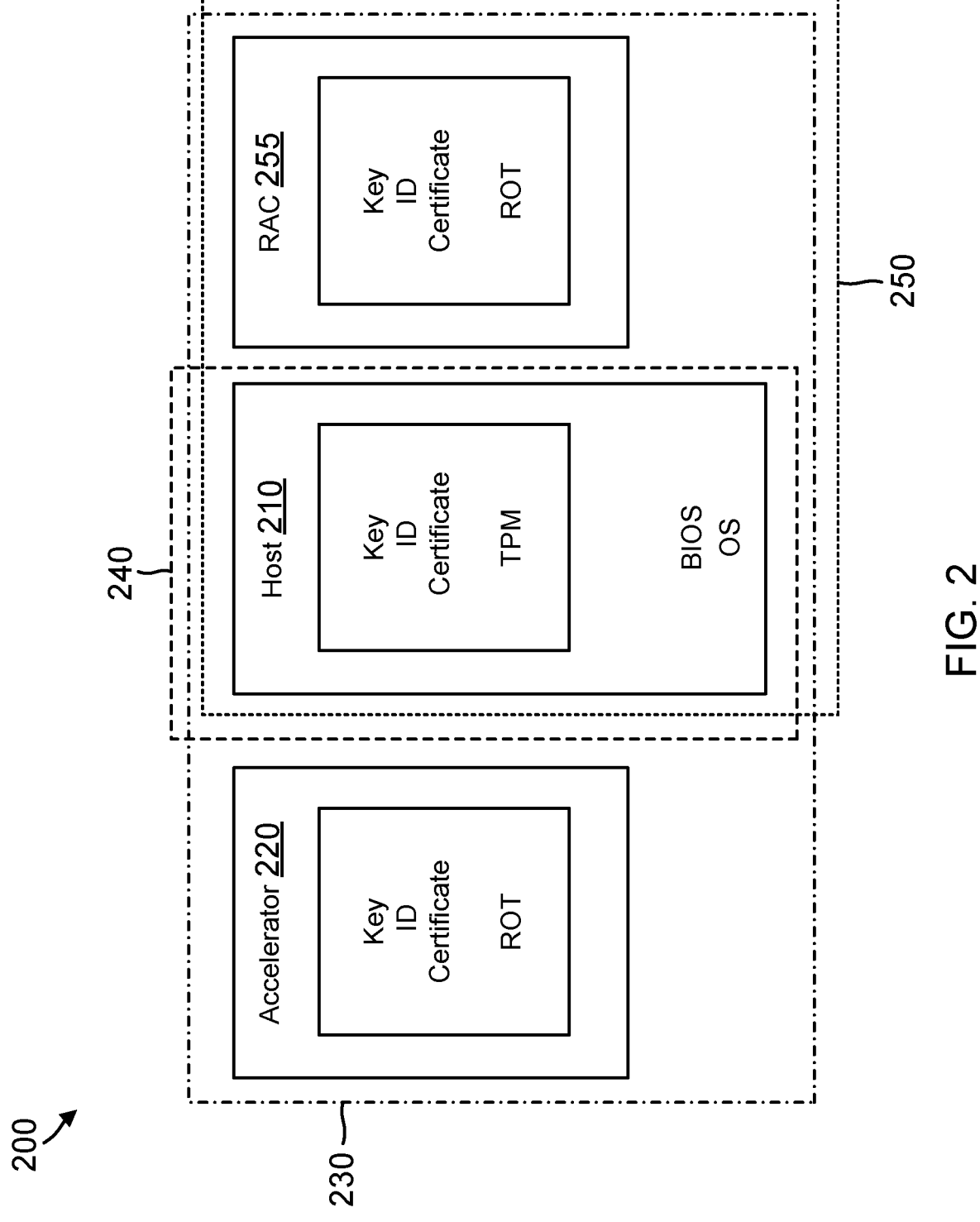
FIG. 2 is a diagram illustrating that certain components of an IHS may be included or not included in some examples systems, according to some embodiments.

FIG. 2 is an illustration of how different components of IHS 100 may be included or not included in some systems 200, according to some embodiments. An example of accelerator 220 is accelerator card 120 of FIG. 1. An example of the host 210 is processor(s) 105 of FIG. 1, and an example of remote access controller 255 is remote access controller 155 of FIG. 1. As noted above, each of the different components may have a cryptographic identity, including a stored private key, an ID, and a certificate. The certificate may include, among other things, an indication of the respective ID as well as a text string encrypted by the private key of the respective device. In the case of the host 210, that cryptographic identity may be kept at the TPM, such as TPM 107 of FIG. 1. Each of the accelerator 220 and remote access controller 255 may store their cryptographic identities in secure storage, such as read-only memory that is encrypted. As noted above, such cryptographic identities may be within the root of trust.

Different systems may be implemented in different ways. For instance, system 250 may be a general server, which includes host 210 and remote access controller 255 to provide out-of-band administration and management of the host 210. System 230 is a composed system, which may include data hardware, such as accelerator 220. Accelerator 220 may be added to a system during or after the original manufacturing process and perhaps by a trusted downstream partner. Examples of composable systems may include accelerated compute and/or storage, which make use of accelerator 220. System 240 may be a storage or network appliance and in some instances may omit remote access controller 255.

FIG. 2 illustrates that a given system may have different device identities, depending on how that system is manufactured and which hardware components it includes. In the case of system 230, it may include device identities associated with accelerator 220, host 210, and remote access controller 255. By contrast, system 240 may not have device identities associated with accelerator 220 or remote access controller 255. Similarly, system 250 may include device identities associated with host 210 and remote access controller 255 but may omit a device identity associated with accelerator 220.

Various embodiments include systems and methods to establish and use a node-level identity that may be applicable to a particular system and used for that system regardless of how many other components and IDs may be in that system.

Figure 3:
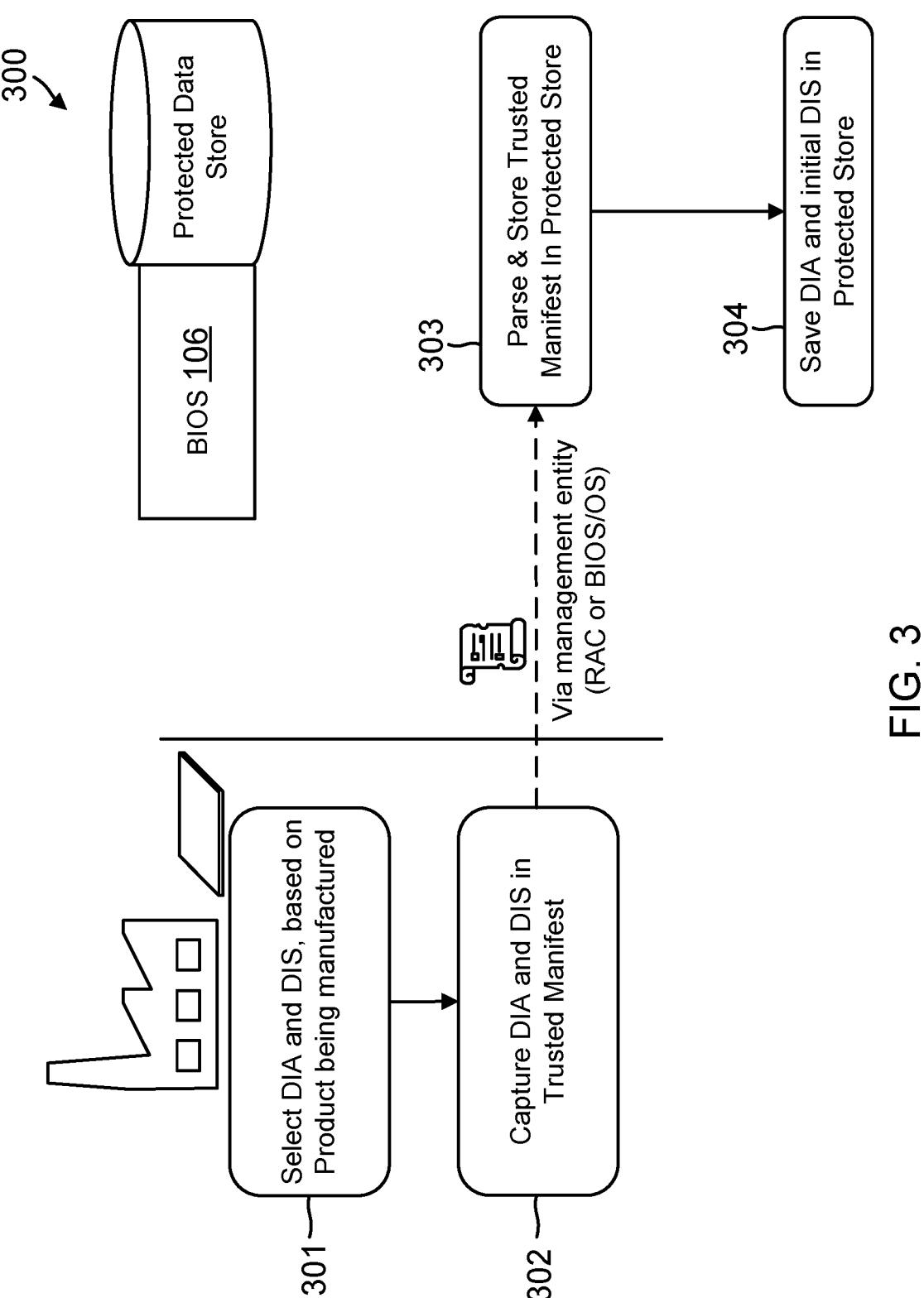
FIG. 3 is a diagram illustrating an example method, which may be performed to establish and store device identities, according to some embodiments.

FIG. 3 illustrates an example method 300, which may be performed to establish and store device identities, according to some embodiments. The actions of method 300 may be performed at a manufacturing facility of an IHS.

At action 301, a manufacturer selects a device identity availability (DIA) and a device identity selector (DIS). In one embodiment, the DIA identifies one or more available device identities, which may be used for a node-level device identity. For example, in system 230 of FIG. 2, the cryptographic identities of the accelerator 220, the host 210, and the remote access controller 255 may populate the DIA. By contrast, in system 250, only the device identities of the host 210 and the remote access controller 255 may populate the DIA. And in example system 210, only the device identity of the host 210 may populate the DIA. In other words, the DIA may be set based upon which hardware is available, and it may be different from server-to-server.

The DIS may be set initially to select one of the cryptographic identities within the DIA. The manufacturer may have a default preference in some examples.

Furthermore, when there is only a single identity in the DIA, that same identity may be used in the DIS.

Continuing with method 300, at action 302, the manufacturer may capture the DIA and the DIS in a trusted manifest. A factory assembly process may include generating a manifest that tracks the individual hardware components that are installed in an IHS. The installed hardware components may include standard components and may also include specialized components that have been requested by a specific customer that has contracted for the assembly and delivery of an IHS.

The trusted manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. The trusted manifest may be encrypted using a private key associated with the manufacturer or other appropriate entity.

At action 303, the trusted manifest is parsed and stored in a protected store of the BIOS, such as BIOS 106 of FIG. 1 or the BIOS of the host 210 of FIG. 2. The protected store of the BIOS may be encrypted or otherwise protected against malicious copying or re-writing. Additionally, at action 304, the BIOS saves the DIA and the DIS in the protected store. As noted above, the DIA and the DIS may be included in the trusted manifest, and action 304 may include storing the DIA and the DIS in a particular memory location within the BIOS and/or using pointers or other appropriate technique to indicate the location of the DIA and the DIS within the protected store.

Once actions 303, 304 are complete, the BIOS stores the DIA and DIS and is configured to read the DIA and DIS during startup. Method 300 illustrates how the DIA and DIS may be initially set by a manufacturer or trusted downstream entity. The DIA and DIS may be made to be unchangeable in some examples, and in other examples either or both of the DIA and the DIS may be changeable later.

Figure 4:
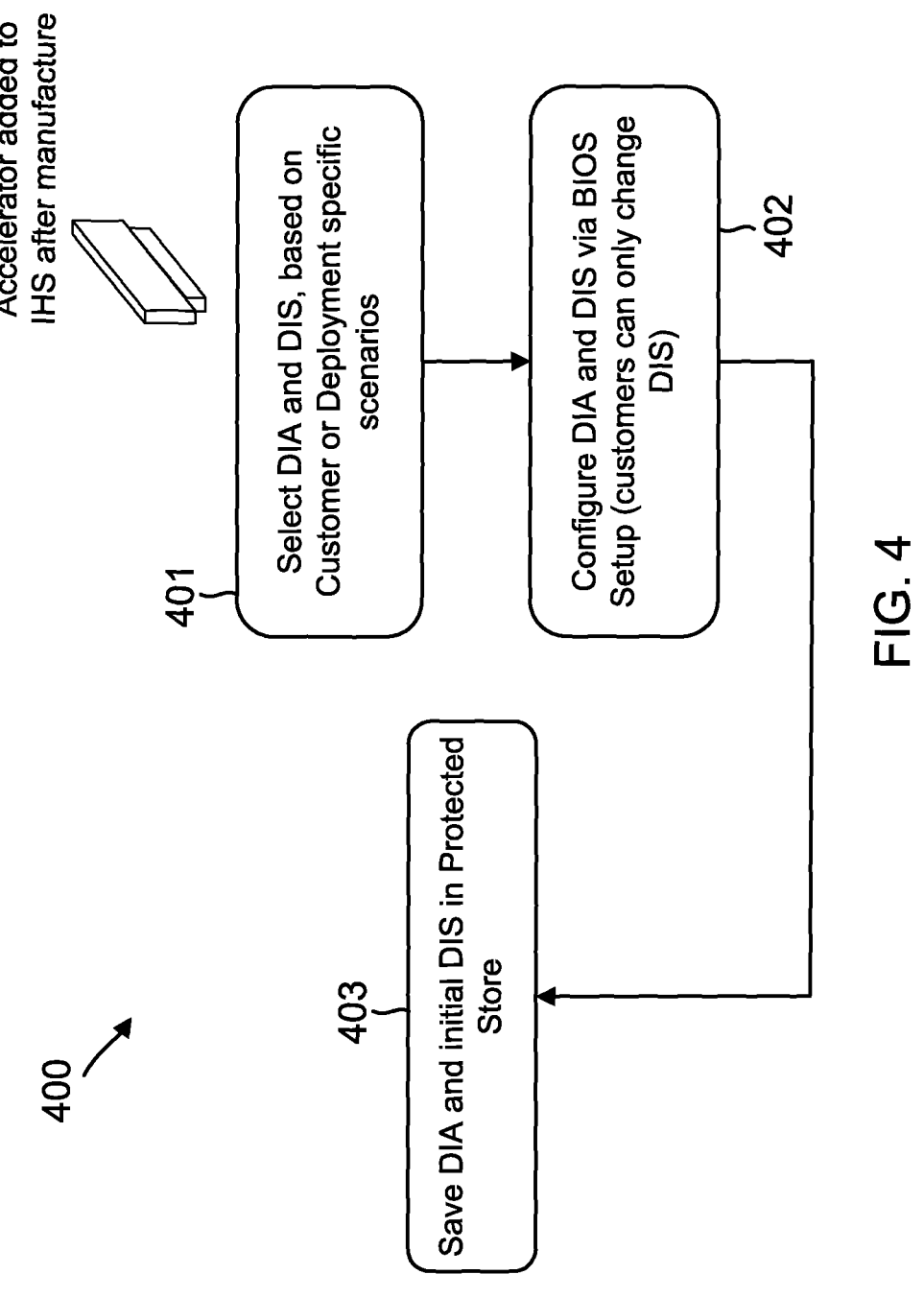
FIG. 4 is a diagram illustrating an example method, which may be performed to establish and store device identities, according to some embodiments.

FIG. 4 illustrates an example method 400, which may be performed to establish and store device identities, according to some embodiments. Method 400 may be performed after manufacture, e.g., by a trusted downstream entity, to add an accelerator, such as accelerator 220 of FIG. 2.

At action 401, the DIA and DIS are set based on a deployment-specific scenario. In this example, the accelerator is added, and the presence of the accelerator may affect the DIA by resulting in the cryptographic identity of the accelerator being included within the DIA. The presence of the accelerator may also affect the DIS, assuming that the downstream entity or the customer prefers to use the cryptographic identity of the accelerator as the node-level device ID.

At action 402, the trusted downstream entity may configure the DIA and the DIS using a BIOS set up technique. In some implementations, the DIA may be set and unchangeable at action 402, whereas in other implementations, the DIA and DIS may be changeable even if set. At action 403, the DIA and the DIS are saved in the protected store of the BIOS. In an example in which the DIS is changeable, the stored value of the DIS may be an initial DIS, and there may be an option for a customer to change the initial setting of the DIS.

Figure 5:
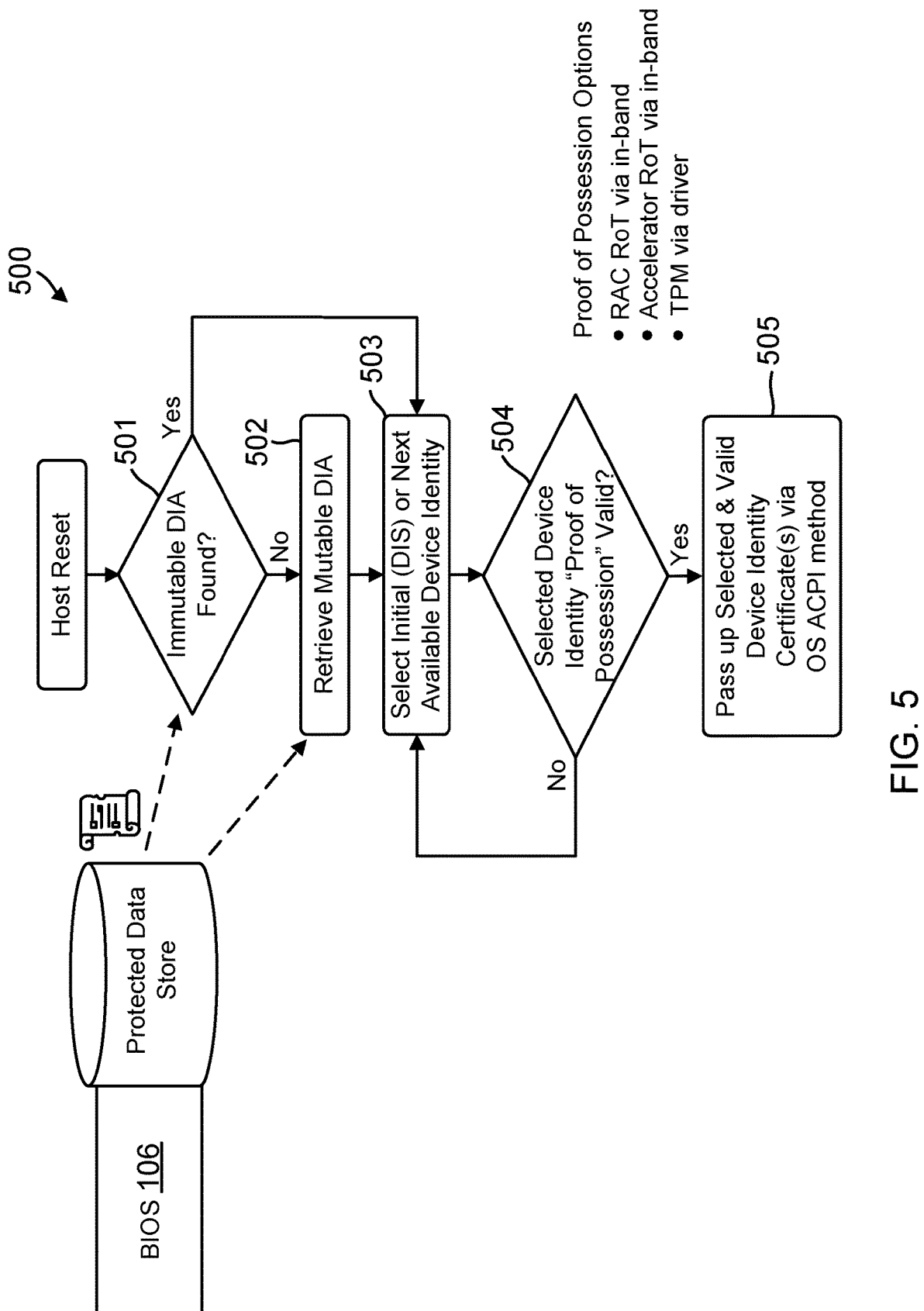
FIG. 5 is a flowchart illustrating an example method for use of a cryptographic identity of a device, according to some embodiments.

FIG. 5 is an illustration of an example method 500, for use of a cryptographic identity of a device, according to some embodiments. Method 500 may be performed during reset of a host device, such as host 210 of FIG. 2.

At reset, the processor (e.g., processor(s) 105 of FIG. 1) accesses the computer-readable code of the BIOS firmware and executes the code. Further, as noted above, the BIOS has a protected data store that includes the DIA and the DIS, such as after actions 303, 304 of FIG. 3 or action 403 of FIG. 4.

At action 501, the BIOS searches its protected data store for an immutable DIA. As noted above, a DIA may be changeable (mutable) or unchangeable (immutable). If there is no immutable DIA at action 501, then the BIOS may retrieve a mutable DIA from the protected data store at action 502. Whether the retrieved DIA is mutable or immutable, method 500 progresses to action 503, which includes accessing the DIS. The DIS indicates a selected device identity.

Action 503 may include verifying that the DIS refers to an allowed device identity. In other words, the BIOS may compare the DIS to the DIA to determine that the DIS identifies an entry in the DIA. If the DIS refers to a device identity that is not in the DIA, then action 503 may include selecting the next available device identity from the DIA.

At action 504, the BIOS performs a proof of possession operation for the selected device identity. For instance, the BIOS may validate a hardware device that is associated with the device identity selected in action 503. Any appropriate proof of possession operation may be performed. In one example proof of possession operation, the BIOS sends a pseudorandom text string to the device associated with the identity. In a successful proof of possession operation, the device receiving the pseudorandom text string may encrypt the pseudorandom text string with its private key and send the encrypted text string back to the BIOS. The BIOS may then use the public key from the certificate of the device to decrypt the encrypted text string. If the decrypted text string matches the pseudorandom text string that was sent to the device, then proof of possession is ensured. If the proof of possession operation fails, then the BIOS may go back to action 503 to retrieve a next available device identity.

The proof of possession operation in action 504 may be performed in any appropriate manner. For instance, if the device associated with the selected identity is external to the host, such as in the case of an accelerator or a remote access controller, then the communication between the BIOS and the device may be in-band or out-of-band as appropriate. On the other hand, if the selected device identity corresponds to the processor of the host itself, then action 504 may include a proof of possession operation relying on intra-processor communications with the TPM.

At action 505, it is assumed that the OS is either booted or is in the process of booting. Accordingly, action 505 includes passing up to the OS from the BIOS a certificate associated with the validated hardware device as well as an instruction to use the identity of that device for attestation. Action 505 may include any appropriate technique to communicate such information from the BIOS to the OS. One example technique may include Advanced Configuration and Power Interface (ACPI) protocols.

At the end of action 505, the OS is in possession of the certificate associated with the selected device, and the OS is configured to use the selected device for attestation.

Figure 6:
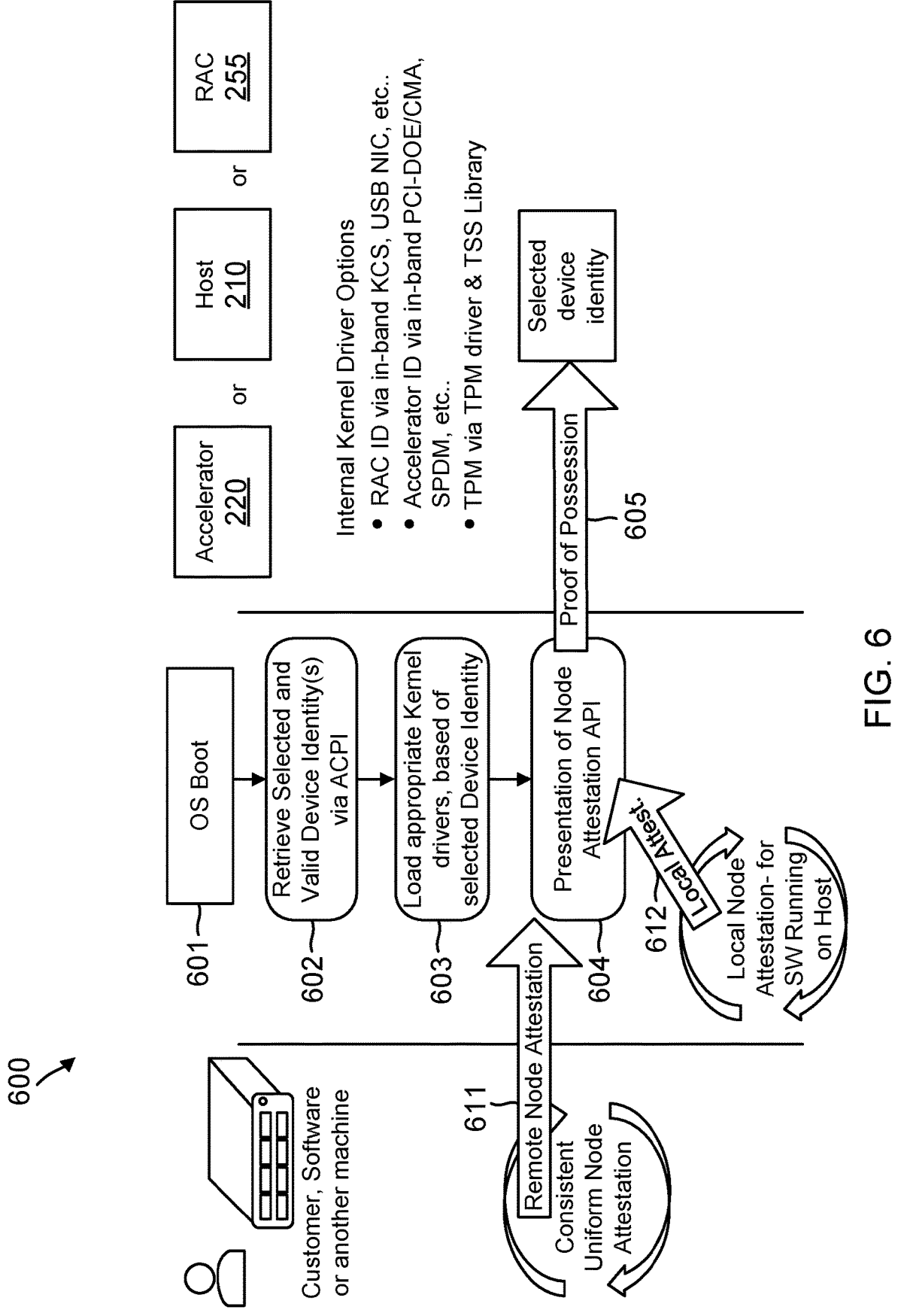
FIG. 6 is a flowchart illustrating an example method for use of a cryptographic identity of a device, according to some embodiments.

FIG. 6 is an illustration of an example method 600 for use of a selected device identity, according to some embodiments. Method 600 may be performed for example by a host device (e.g., processor(s) 105 of FIG. 1) that is running an OS, such as illustrated at FIG. 2.

At action 601, the operating system boots. At action 602, the operating system retrieves the selected and validated device identity certificate. Action 602 is similar to action 505 of FIG. 5, whereas action 505 is from the perspective of the BIOS, and action 602 is from the perspective of the OS.

At action 603, the OS loads appropriate kernel drivers based on information retrieved at action 602. For instance, if the DIS indicates an accelerator, a remote access controller, or other device external to the host, then the host may employ a driver to communicate with such device. Accordingly, the host may load appropriate drivers to facilitate communication with the device. In any event, booting may include loading any appropriate drivers for any appropriate communication.

At action 604, the OS presents a node attestation application programming interface (API) for remote devices and local software. Specifically, remote devices and/or local software may use the API for attestation requests 611, 612. In the case of a remote node, it uses the API of action 604 to send an attestation request 611 to the OS. Similarly, in the case of a local application, it uses the API to send an attestation request 612 to the OS. In other words, both remote and local attestation may use the API of action 604 for attestation, rather than sending a request to an IP address of an assumed device.

Action 605 includes the OS passing the attestation request to the selected device. In the case of an external device, such as an accelerator or a remote access controller, the OS may use an appropriate driver to pass the attestation request. In the case in which the host device itself has been selected, the OS may use an intra-chip protocol to access the TPM, such as a TPM driver in a TPM2 Software Stack (TSS). Accessing the RAC 255 may include using in-band Keyboard Controller Style (KCS), a Universal serial bus (USB) network interface card, or other appropriate technique. Accessing the accelerator 220 may include using peripheral Component interconnect (PCI)-data object exchange (DOE), component measurement and authentication (CMA), security protocol and data model (SPDM), or the like.

In any event, the attestation requests 611, 612 may result in proof of possession operations being performed by the OS on behalf of the requesting device or software. Examples of proof of possession operations are described above with respect to method 500 of FIG. 5. Action 605 may include the OS confirming proof of possession to the requesting device or software once proof of possession has been completed.

Thus, during runtime, various devices or software components may send attestation requests to the OS. The OS uses the device identity referred to by the DIS as the device identity for the various attestation requests. In this manner, the computing system may have a coherent, node-level device identity that it presents to internal and external requesters for purposes of validation by those requesters.

An advantage of some embodiments may include increased coherency. Specifically, in a device that may include multiple available device identities for attestation, various embodiments described herein may select one of those device identities for attestation, thereby providing consistent attestation to both external and internal requesters. One potential benefit may be a reduction in validation errors by eliminating or reducing multiple validation candidates and through simplifying the validation process to go to one selected device identity, perhaps through an API (e.g., as an action 604).

FIG. 7 is an illustration of an example method 700, which may be performed by an IHS, such as IHS 100 of FIG. 1.

At action 701, a BIOS, such as BIOS 106 or the BIOS of FIG. 2, stores data indicating a plurality of available device identities. An example of data indicating a plurality of device identities is a DIA, such as discussed above with respect to FIGS. 3 and 4. Action 701 may also include storing an identity selector, an example of which may include the DIS as discussed above with respect to FIGS. 3 and 4. The data stored in action 701 may be stored in some examples in a memory associated with a BIOS, such as a protected data store.

At action 702, a BIOS verifies that a device identity selector, such as a DIS, refers to an allowed device identity. The DIS may refer to a first device identity out of a plurality of device identities of the DIA. Action 702 may include comparing the DIS to the DIA, and confirming that the DIS refers to a device identity included within the DIA.

At action 703, the BIOS validates a first hardware device that is associated with the first device identity. Action 703 may include performing a proof of possession operation directed to a device corresponding to the selected device identity, such as a host device, an accelerator, a remote access controller, or the like. An example of action 703 is discussed with respect to action 504 of FIG. 5.

At action 704, the BIOS communicates a certificate associated with the first hardware device and an instruction to use the first hardware device identity for attestation. For instance, the BIOS may communicate with an OS using ACPI protocols, such as discussed above with respect to FIGS. 5 and 6.

Figure 8:
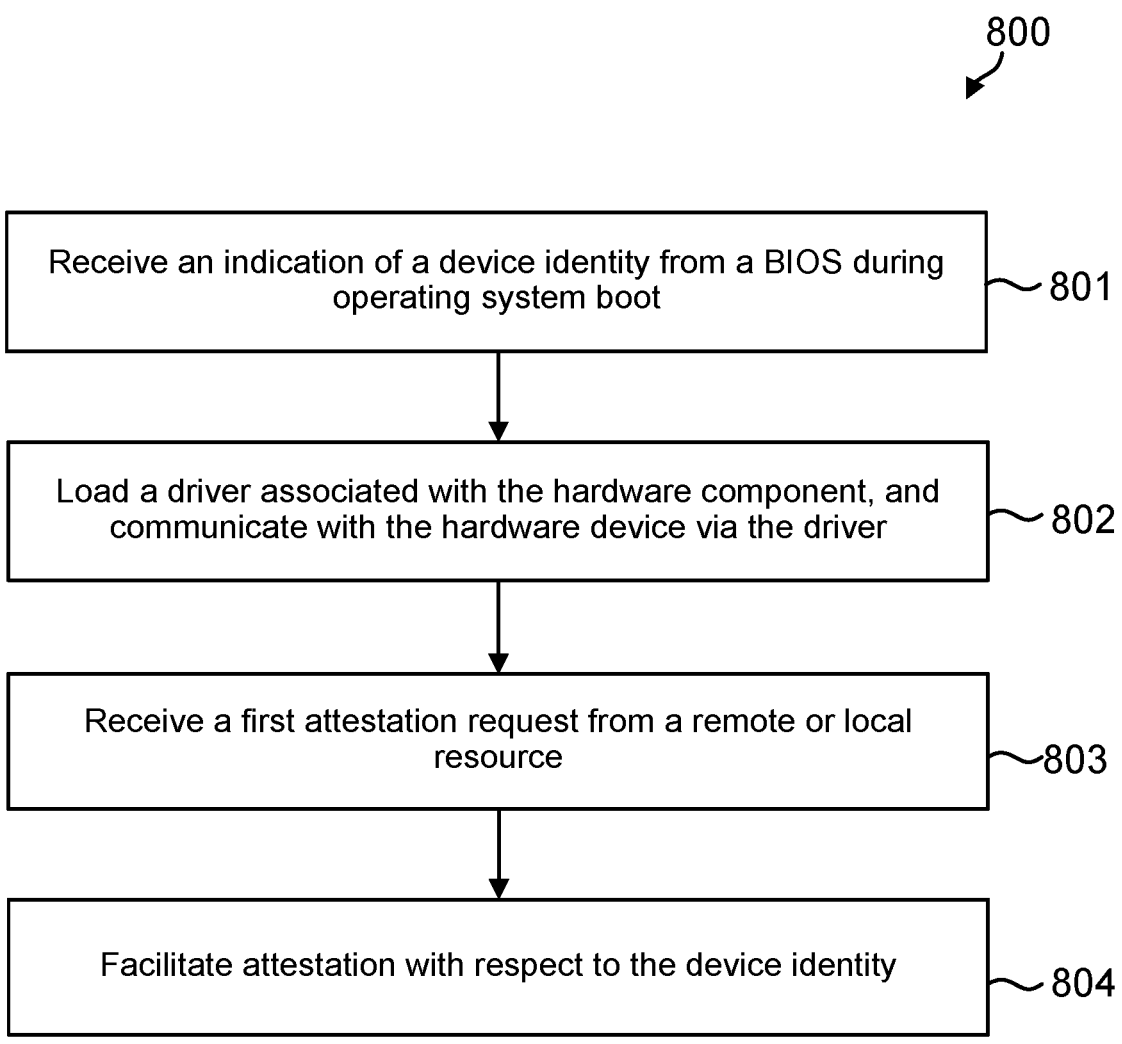
FIG. 8 is a flowchart illustrating an example method to be performed by an IHS, according to some embodiments.

FIG. 8 is an illustration of an example method 800, which may be performed by an IHS, such as IHS 100 of FIG. 1.

At action 801, the OS receives an indication of a device identity from a BIOS during OS boot. For instance, the OS and BIOS may employ ACPI protocols so that the OS receives the DIA and the DIS from the BIOS. The indication of the device identity at action 801 may include an indication in the DIS that a particular device identity should be used for attestation. An example is discussed above with respect to action 602 of FIG. 6.

At action 802, the OS loads a driver associated with a hardware component that corresponds to the device identity. Action 802 may also include the OS communicating with the hardware device via the driver. An example is discussed above with respect to action 603 of FIG. 6.

At action 803, the OS receives a first attestation request from a remote or local resource. For instance, an example of a remote resource may be a remote node, such as discussed above with respect to attestation request 611. An example of a local resource may be a software application running on the OS, such as discussed with respect to attestation request 612.

At action 804, the OS may facilitate attestation with respect to the device identity. An example is discussed above in which the OS presents an API for use by the remote and local resources to request attestation. The OS, upon receipt of a request for attestation, may then perform a proof of possession operation with respect to the particular device identity. In other words, should the DIS refer to a device external to the host, such as an accelerator or remote access controller, the OS may perform a proof of possession operation directed at the accelerator or remote access controller. Similarly, should the DIS refer to the host itself, the OS may perform a proof of possession operation directed at a TPM or other resource at the host. Action 804 may also include returning a confirmation to the resource requesting attestation.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for selecting a first device identity from a plurality of available device identities, the method comprising:

accessing a protected data store that has a plurality of entries, including a first entry for the first device identity and a second entry for a second device identity, wherein the first device identity corresponds to a first hardware device of a node and the second device identity corresponds to a second hardware device of the node, further wherein the first device identity is associated with a first certificate and the second device identity is associated with a second certificate;

at a Basic Input Output System (BIOS) or Unified Extensible Firmware Interface (UEFI), verifying that a device identity selector, which indicates the first device identity, refers to an allowed device identity;

at the BIOS or UEFI, validating the first hardware device associated with the first device identity; and communicating, from the BIOS or UEFI to an operating system, the first certificate and an instruction to use the first device identity as an identity for the node for attestation by software running on a host device of the node or for attestation by a remote node.

2. The method of claim 1, wherein communicating the first certificate comprises:

communicating between the BIOS or UEFI and the operating system according to Advanced Configuration and Power Interface (ACPI) protocols.

3. The method of claim 1, further comprising:

storing, in the protected data store, a trusted manifest that includes data indicating the plurality of available device identities as being allowed and includes the device identity selector; and wherein verifying that the device identity selector refers to an allowed device identity includes determining that the device identity selector identifies an entry in the data indicating the plurality of available device identities.

4. The method of claim 3, further comprising:

during BIOS or UEFI setup, configuring the data indicating the plurality of available device identities as being allowed and configuring the device identity selector.

5. The method of claim 1, wherein validating the first hardware device comprises:

performing a proof of possession operation based on the first device identity.

6. The method of claim 1, wherein the first hardware device comprises the host device.

7. The method of claim 1, wherein the BIOS or UEFI is associated with a central processing unit (CPU) of the host device, and wherein the first hardware device comprises a device other than the host device.

8. The method of claim 7, wherein the first hardware device comprises a hardware accelerator or a baseboard management controller (BMC).

9. The method of claim 1, wherein the first certificate comprises an identifier of the first hardware device and a public key of the first hardware device.

10. An Information Handling System (IHS) comprising:

a host device comprising one or more processors and having a first device identity and a first hardware root of trust;

a hardware component having a second device identity and a second hardware root of trust, wherein the first device identity is associated with a first certificate and the second device identity is associated with a second certificate; and one or more memory devices coupled to the one or more processors, the memory devices storing computer-readable instructions that, upon execution by the one or more processors, cause the host device to:

receive, by an operating system of the host device, an indication of the second device identity for use as a device identity of the IHS from a Basic Input Output System (BIOS) or Unified Extensible Firmware Interface (UEFI) during operating system boot, wherein the indication of the second device identity includes the second certificate;

in response to the indication of the second device identity, load a driver associated with the hardware component and communicate with the hardware component via the driver;

receive a first attestation request from a remote node to perform attestation of the IHS; and facilitate attestation with respect to the second device identity, including facilitating a proof of possession operation with respect to a private key corresponding to the second hardware root of trust, in response to the first attestation request.

11. The IHS of claim 10, wherein the hardware component comprises a baseboard management controller (BMC) configured to provide out-of-band management for the host device.

12. The IHS of claim 10, wherein the hardware component comprises a hardware accelerator coupled to the host device.

13. The IHS of claim 10, wherein the instructions to cause the host device to receive the indication of the second device identity from the BIOS or UEFI comprises instructions to cause the operating system to:

receive the second certificate according to Advanced Configuration and Power Interface (ACPI) protocols.

14. The IHS of claim 10, further comprising instructions that cause the host device to:

receive a second attestation request from a software application running on the operating system to perform attestation of the IHS; and facilitate attestation with respect to the second device identity, including facilitating a subsequent proof of possession operation with respect to the private key corresponding to the second hardware root of trust, in response to the second attestation request.

15. A computer-readable storage device having instructions stored thereon for validating secure assembly of an IHS (Information Handling System), wherein execution of the instructions by one or more processors of the IHS causes an operating system (OS) of the IHS to:

receive, from a Basic Input Output System (BIOS) or Unified Extensible Firmware Interface (UEFI), a certificate of a first hardware component of the IHS and an instruction to use a device identity of the first hardware component as a device identity of the IHS for attestation by software running on a host of the IHS or for attestation by a remote node;

in response to the instruction to use the device identity of the first hardware component, load a driver associated with the hardware component and communicate with the hardware component via the driver; and facilitate attestation of the IHS, including facilitating a proof of possession operation with respect to a private key corresponding to a hardware root of trust of the first hardware component.

16. The computer-readable storage device of claim 15, wherein the BIOS or UEFI is associated with a central processing unit (CPU) of the host, and wherein the certificate is associated with a device other than the host.

17. The computer-readable storage device of claim 16, wherein the certificate is associated with a hardware accelerator of the IHS.

18. The computer-readable storage device of claim 16, wherein the certificate is associated with a baseboard management controller (BMC) of the IHS.

19. The computer-readable storage device of claim 15, wherein the certificate of the first hardware component comprises an identifier of the first hardware component and a public key of the first hardware component.

20. The computer-readable storage device of claim 15, wherein the instructions to cause the IHS to receive the certificate comprises instructions to:

employ Advanced Configuration and Power Interface (ACPI) protocols to receive the certificate.

* * * * *